United States Patent
Kaminsky et al.

(10) Patent No.: US 8,386,568 B2
(45) Date of Patent: Feb. 26, 2013

(54) ANNOTATING AND ROUTING MESSAGE CONTENT

(75) Inventors: David L. Kaminsky, Chapel Hill, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 2464 days.

(21) Appl. No.: 10/235,324

(22) Filed: Sep. 5, 2002

(65) Prior Publication Data

US 2004/0049543 A1    Mar. 11, 2004

(51) Int. Cl.
*G06F 15/16* (2006.01)
(52) U.S. Cl. ........................ 709/206; 709/205
(58) Field of Classification Search ............... 709/205, 709/206
See application file for complete search history.

(56) References Cited

U.S. PATENT DOCUMENTS

| | | | |
|---|---|---|---|
| 6,212,548 B1 * | 4/2001 | DeSimone et al. | 709/204 |
| 6,247,045 B1 * | 6/2001 | Shaw et al. | 709/207 |
| 6,563,913 B1 * | 5/2003 | Kaghazian | 379/93.24 |
| 7,127,741 B2 * | 10/2006 | Bandini et al. | 726/14 |
| 2003/0120497 A1 * | 6/2003 | D'Amico et al. | 705/1 |
| 2003/0233420 A1 * | 12/2003 | Stark et al. | 709/206 |
| 2004/0054744 A1 * | 3/2004 | Karamchedu et al. | 709/206 |
| 2005/0203990 A1 * | 9/2005 | Weksel | 709/201 |

* cited by examiner

*Primary Examiner* — John Follansbee
*Assistant Examiner* — Glenford Madamba
(74) *Attorney, Agent, or Firm* — Marcia L. Doubet

(57) ABSTRACT

Methods, systems, computer program products, and methods of doing business for improving communication, whereby message content is routed efficiently while allowing different recipients to receive different versions of the content. A portion of the electronic conversation in an instant messaging session (or of messages in other messaging systems) can be identified as being relevant to a third party (or parties), and information can be specified for routing the relevant information to that third party. A variety of delivery mechanisms may be used. Approval may be obtained prior to routing an annotated message. The recipients of annotated message may be human users and/or automated processes. The message author may also be a human or an automated process.

16 Claims, 6 Drawing Sheets

FIG. 3A

```
<block>
  <text>Speaking of the super-secret project Condor,</text>
  <annotate>Pat, please schedule a meeting on this. Thanks.</annotate>
  <route>sametime:pat</route><route>sendto:pat@XYZCompany.com</route>
</block>
I think that we can implement it by using web services and adding SSL.
```

FIG. 3B

```
<block>
  <text>Speaking of the super-secret project Condor,</text>
  *Pat, please schedule a meeting on this. Thanks.*
</block>
```

FIG. 3C

Speaking of the super-secret project Condor, I think that we can implement it by using web services and adding SSL.

FIG. 4

```
<block>
  <text>Speaking of the super-secret project Condor, </text>
  <exclude>which we all know is seriously behind schedule, </exclude>
  <text>for which Jim and Paul have prepared status updates, </text>
  <annotate>Pat, please schedule a meeting on this.  Thanks.</annotate>
  <route>sametime:pat</route><route>sendto:pat@XYZCompany.com</route>
</block>
I think that we can implement it by using web services and adding SSL.
```

ANNOTATING AND ROUTING MESSAGE CONTENT

RELATED INVENTION

The present invention is related to commonly-assigned U.S. patent application Ser. No. 09/376,896, titled "Technique for Creating Audience-Specific Views of Documents" filed Aug. 18, 1999; now abandoned).

BACKGROUND OF THE INVENTION

1. Field of the Invention

The present invention relates to communication systems, and deals more particularly with methods, systems, computer program products, and methods of doing business by annotating and routing messages among users of such systems.

2. Description of the Related Art

Instant messaging systems are a popular communications mechanism for many people, and provide for instant, real-time communication between users who are connected to the system through an on-line or electronic networking environment such as the Internet, World Wide Web (hereinafter, "Web"), or corporate internal intranets. Examples of instant messaging systems include Yahoo!® Messenger, AOL Instant Messenger$^{SM}$, and Sametime®. ("Yahoo!" is a registered trademark of Yahoo! Inc. in the United States, other countries or both, "AOL Instant Messenger" is a service mark of America Online, Inc., and "Sametime" is a registered trademark of Lotus Development Corporation in the United States, other countries or both.)

Instant messaging systems provide real-time awareness of who is logged on. Typically, an instant messaging (hereinafter, "IM") system user has an address book or "buddy list" containing names or nicknames for those people with whom he communicates. The entries in this address book are used for selecting a message recipient. The IM system ("IMS") typically indicates, using a visual cue (such as different icons or different fonts), which of the people are logged on to the system and which are not. When the message sender and the target recipient are both currently logged on to an IMS (which may be the same IMS, or a different IMS), the message can be delivered and presented to the recipient nearly instantly (depending on network delay). Instant messaging systems are well known in the art, and a detailed description thereof is not deemed necessary to an understanding of the present invention.

Instant messaging systems are becoming integral business tools, and enable team members or business associates to communicate more efficiently and effectively (e.g., as they collaborate on a project). In the course of an IM session between two or more business associates, it might become clear that a portion of the electronic conversation is relevant to a third party, such as an administrative assistant. In such cases, it would be advantageous for the relevant information to be routed to that third party. Current IM systems do not provide techniques for selectively sending information to other parties.

Similarly, e-mail systems have crude abilities to route information to parties other than the target message recipients (identified using a "to" list), namely using "cc" and "bcc" lists (i.e., carbon copy and blind carbon copy lists). Typically, the entire e-mail message is sent to the parties named on the "cc" and "bcc" lists. Some e-mail messages contain information that is inappropriate for routing beyond the "to" list. The related invention discloses techniques with which an e-mail author or document author can create audience-specific views of documents, such that different views or versions of a message or document can be created and sent to recipients (or created and stored for later sending). As discussed therein, it is not feasible for a content author to have to create multiple versions of content and manually send the correct version to each different set of audience members.

There is an ongoing need for techniques that provide for routing message content efficiently while allowing different recipients to receive different versions of the content.

SUMMARY OF THE INVENTION

An object of the present invention is to provide techniques for routing message content efficiently while allowing different recipients to receive different versions of the content.

Another object of the present invention is to provide improved techniques for IM users to communicate and exchange information.

Yet another object of the present invention is to define techniques that enable specification of alternative routing mechanisms for annotated message content.

A further object of the present invention is to define techniques that enable annotated message content to be approved before routing.

Still another object of the present invention is to define techniques for annotating message content for sending to (or from) an automated process.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for annotating and routing message content. In one aspect, this technique preferably comprises: creating, by a message author, a message to be sent to one or more recipients; identifying, by the message author, one or more portions of the message, where the identified portions are to be routed to one or more other recipients; identifying, by the message author, the one or more other recipients; generating a second message using the identified portions; sending the message to the one or more recipients; and sending the second message to the one or more other recipients. (The message author may desire, for example, that the one or more other recipients are to receive the second message but are not to receive the created message in its entirety.)

The message may be an IM system message, an e-mail message, or another type of message. The second message may be sent as an IM system message, an e-mail message, a text pager message, or another type of message. The one or more other recipients of the second message may be human users and/or one or more automated processes. In the latter case, the second message is generated in a format adapted for processing by the one or more automated processes. The message author may, in some cases, be an automated process.

Optionally, prior to sending the second message, a determination may be made as to whether the one or more recipients approve sending the second message; if not, the sending of the second message is suppressed.

The technique may further comprise specifying, by the message author, at least one annotation to be associated with the identified portions of the message. In this case, generating the second message uses the annotations as well as the identified portions. Optionally, the message sent to the one or more recipients includes the annotations.

Optionally, contextual information may be programmatically supplied for inclusion in the second message.

In another aspect, this technique preferably comprises: receiving an annotated message, wherein the annotated message comprises a message body; one or more delimiters, each of the delimiters marking each of one or more portions of the message body; an annotation corresponding to each of the marked portions; and a recipient list for the annotations; and processing the annotated message. The processing preferably further comprises sending the message body to one or more message recipients and sending the marked portions and the corresponding annotations to the recipient list.

The techniques disclosed herein may also be used advantageously to provide new methods of doing business. As one example, a system implementing the improved message annotation and routing techniques disclosed herein may be marketed to users under various revenue models, including pay-per-use, monthly subscriptions, and so forth. As another example, providers of automated processes that are invoked by annotations created according to the present invention may charge users for use of these automated processes.

The present invention will now be described with reference to the following drawings, in which like reference numbers denote the same element throughout.

BRIEF DESCRIPTION OF THE DRAWINGS

FIGS. 3A-3C illustrates an example of using markup language syntax for annotating messages, according to preferred embodiments of the present invention;

FIG. 4 provides another example of using markup language syntax for annotating messages, according to preferred embodiments of the present invention.

DESCRIPTION OF PREFERRED EMBODIMENTS

Figure 1:
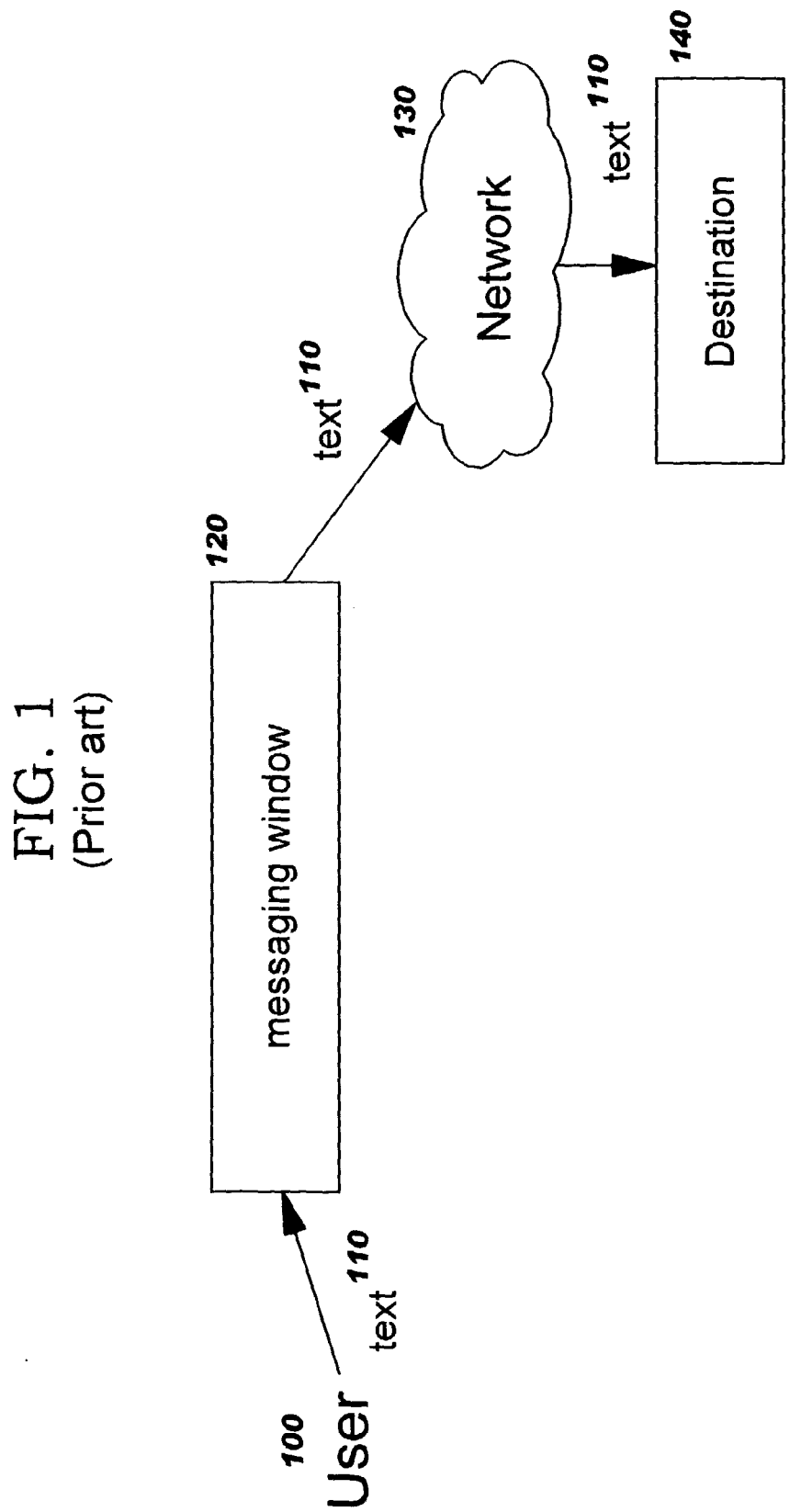
FIG. 1 illustrates how messages are created and routed, according to the prior art.

The present invention defines techniques for providing more productive ways for people to communicate and to exchange messages. Selected portions of messages are annotated, and the messages are routed according to the annotations. The disclosed techniques allow for fine-grained control over which portions of messages are sent to which recipients, and also allow specification of one of more routing methods/mechanisms to be used.

Embodiments of the present invention may be used with various types of communication systems. These various types include—but are not limited to—e-mail systems and instant messaging systems. (The term "message" is used herein to refer to communications using these various types of systems, for ease of reference.) The discussions herein are primarily in terms of using the disclosed techniques with IM systems, although the applicability to other systems such as e-mail should be readily apparent.

Preferred embodiments add three components to a message: delimiters, recipient identifiers, and annotation. When typing an instant message, the author can choose to insert these components. A set of beginning and ending delimiters marks the region(s) of an IM session that will be routed to a third party (i.e., to a person who is not a participant in the IM session, or to an automated process that operates on the message as described below, or to a combination of one or more persons and/or automated processes). The recipient identifiers indicate the party or parties to which the region(s) will be routed. The annotation is a message intended for the third party, typically to specify a requested action. For example, the annotation might say "Please schedule a meeting on this.".

The message author may type the delimiters, recipient identifiers, and/or annotation directly into the message he is typing. Or, an implementation may provide automated assistance for adding one or more of these components. For example, an icon or function key may be provided for the user to activate when a beginning delimiter should be inserted, and this icon or function key may be activated again (i.e., in a "toggle" mode) when an ending delimiter should be inserted. Or, separate icons or function keys may be provided. The author might be allowed to drag and drop recipient identifiers from his buddy list into a recipient list of a message being annotated. One or more graphical buttons might be provided for authors to insert frequently-used annotations into their messages.

Optionally, an implementation of the present invention may allow message authors to specify whether the annotation and routing information should be displayed to the IM partner(s).

The message author may optionally specify one or more routing methods to be used when the annotated message is routed. When more than one method is specified, the order of specification is preferably used as the order of attempting delivery with each method in turn. A wide variety of delivery methods may be supported, including instant messaging, e-mail, text pages, and so forth.

In a further optional aspect, the implementation may require approval from IM partners before routing an annotated message. This provides some measure of privacy, especially for an implementation enforcing "do not copy" policies.

Note that the message author is not necessarily a human. In some cases, an automated process (commonly referred to as a "bot") is a participant in IM sessions. This automated process may generate message content, and in accordance with the present invention, may annotate the message content for routing to others (whether those others are human beings or other automated processes).

The manner in which messages are created and routed in the prior art is illustrated in FIG. 1. A user 100 types messages 10 into a messaging window 120 (or similar user interface, equivalently), typically as text. The messages are routed through the network 130 to a destination 140 by a server infrastructure (not shown).

Figure 2:
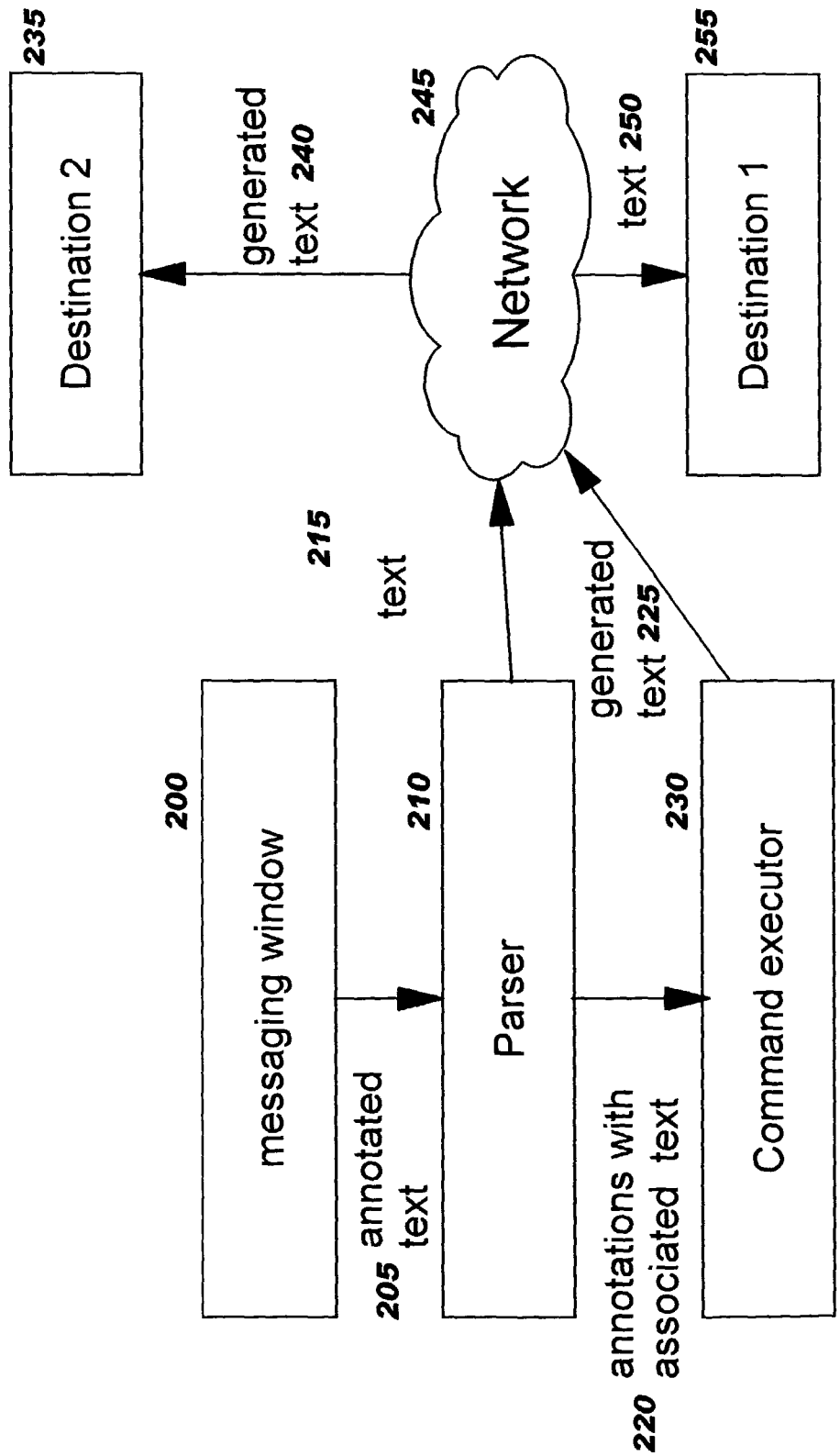
FIG. 2 shows components involved in routing annotated messages according to preferred embodiments of the present invention.

FIG. 2 shows components involved in routing annotated messages according to preferred embodiments of the present invention. In this system, text is annotated by the user, and this annotated text 205 is passed from the messaging window 200 to a parser 210. This parser locates the delimiters, recipient identifiers, and annotations, and separates out standard (i.e., unannotated) messages from annotated text. (Techniques for parsing messages in this manner are relatively straightforward.) The standard messages 215 are delivered through the network 245 as in prior art systems. See text message 250, which in this example is targeted for Destination 1 (element 255).

The annotations and their associated text 220 are passed from the parser to a command executor 230. The command executor determines the appropriate action for each command in the annotated text. For example, if the command indicates that an instant message is to be sent to a second entity (i.e., a person or automated process), then the command executor generates the appropriate message 225 and sends it to the network. The message is then forwarded 240, and in this example is sent to Destination 2 (element 235).

When an annotated message is sent to an automated process, the command executor is preferably adapted for generating the message in a format expected by that automated process. As an example of this type of automated process, annotations related to scheduling a meeting might be sent to an automated meeting scheduling agent.

In some cases, a plurality of messages will be generated. For example, annotations might be sent to an automated scheduling agent and to one or more people who are not currently participating in the IM session.

The command executor may be embodied within an augmented IM system, or may be a separate component that is operatively connected with the IM system.

FIG. 3A shows an example of markup language syntax that may be used for annotating a message in an IM system, according to preferred embodiments, and FIGS. 3B and 3C show how this annotated message may be transformed for forwarding to recipients. A delimiter such as "<block>" and "</block>" tags marks the portion of the message that is annotated and that will be forwarded to a third party (or to multiple third parties, depending on the recipient identifiers). These tags use Extensible Markup Language ("XML") style notation, for purposes of illustration. (As will be obvious, the tag syntax used in illustrating preferred embodiments is merely illustrative. Furthermore, it should be noted that the sample message in FIG. 3A has been formatted using indentation for emphasizing the annotations and other message components. The user is not required to provide this type of formatting when annotating his messages.)

The annotation text is enclosed by "<annotate>" and "</annotate>" tags, and in this example asks a user "Pat" to schedule a meeting. The text to which this annotation pertains is enclosed in "<text>" and "</text>" tags. In this example, a portion of the message is outside the "<block>" and "</block>" delimiters, and thus this text will not be forwarded to Pat. Two pairs of "<route>" and "</route>" tags are used, in this example, to specify two methods that may be used for routing the generated message to Pat. Pat is identified as the recipient of the generated message by specifying "sametime" as a routing keyword and using her Sametime nickname in the first case, and by an e-mail message keyword "sendto" and Pat's e-mail address in the second case.

FIG. 3B shows an example of the message that will be sent to Pat after the message in FIG. 3A is processed by the command executor. The message is first routed to Pat using Sametime, and if this is unsuccessful, then by e-mail. In preferred embodiments, the text is visually differentiated from the annotation, e.g., by using font, color, italicizing, indentation, etc., or by leaving in the delimiters. For purposes of illustration, the "<annotate>" and "</annotate>" tags in this example were interpreted by the command executor as a signal to translate the enclosed text into a larger, italicized font. (Optionally, the remaining tags may be removed as well.) Many other formatting techniques may be used to convey the annotation to the recipient. For example, the text might be rendered in a different color than the remainder of the message. Alternatively, rather than removing them, the "<annotate>" and </annotate>" tags might be left in the message.

To add further context to the routed message, an implementation of the present invention may optionally add supplementary information known by the IMS to the message. Such information may include the time of the IM session and/or an identification of the session participants.

FIG. 3C shows how other IM participants in the annotated message author's IM session will view the message in FIG. 3A, according to preferred embodiments. That is, referring briefly to FIG. 2, the tags are preferably removed from the annotated messages 205 when forwarded by the parser 210 as text messages 215. In this case, the other message recipients are not distracted by the presence of annotations and related information such as routing methods. However, if it is desirable in a particular implementation for the other IM participants to be aware that the message has been annotated and routed, then the message as annotated by the author (see FIG. 3A) may be forwarded to those participants.

The example in FIGS. 3A-3C illustrates two advantages of using the present invention. First, the message author does not need to perform any action outside his regular IM session to have the information routed to the third party. Second, any confidential, sensitive, or otherwise non-essential information can be selectively excluded. Furthermore, as can be seen by this example, the techniques of the present invention allow a message author to have much more control over content sent to other parties when using e-mail than is available in conventional email systems that provide only "cc" and "bcc" list functionality.

FIG. 4 shows a modified version of the annotated message in FIG. 3A. In this example, an "<exclude>" and "</exclude>" tag pair is used to identify text from an annotated message that is to be excluded when generating a message for routing to the identified third party. These tags may be used to prevent non-essential information from being distributed to other parties.

Figure 5:
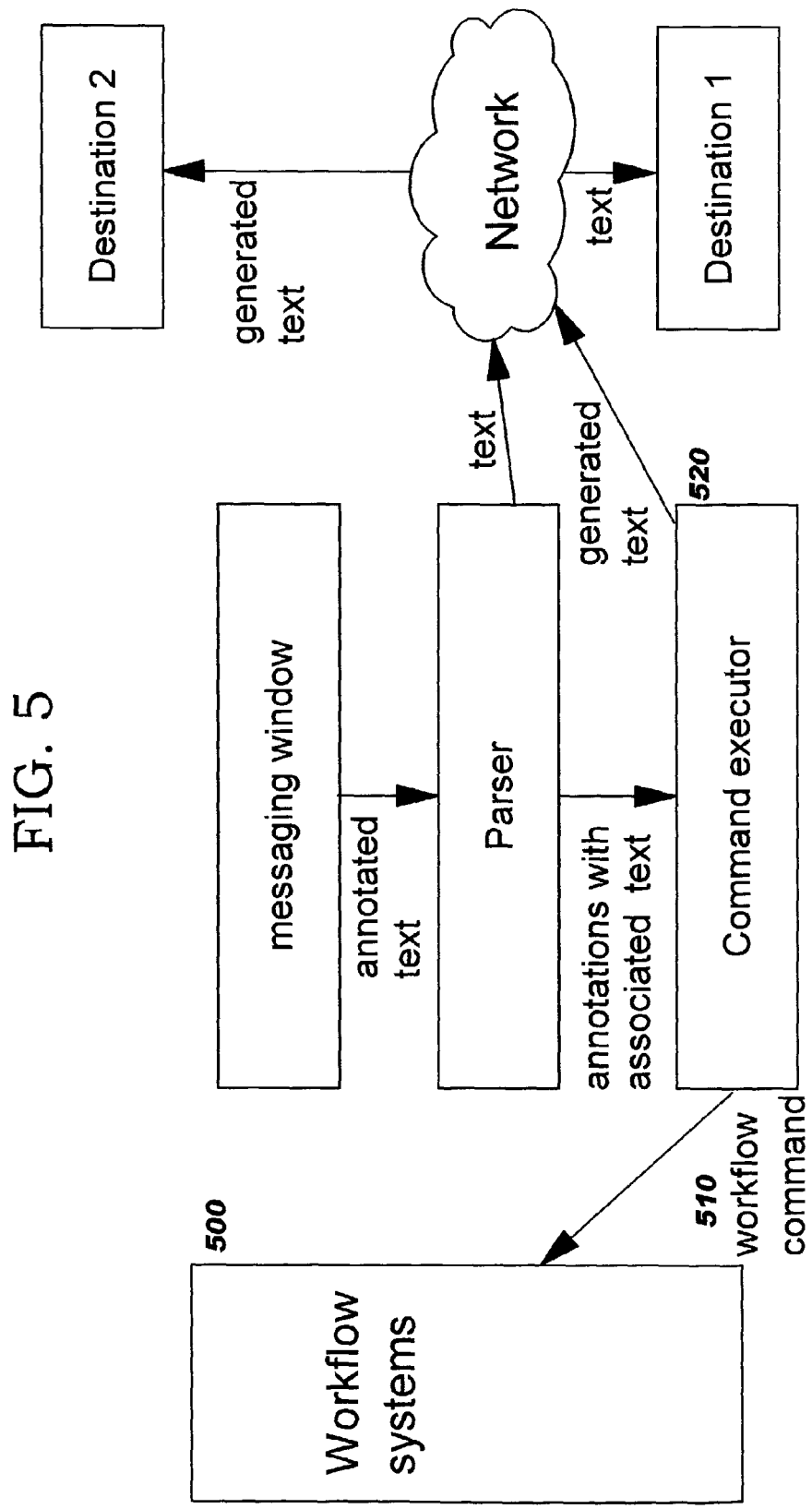
FIGS. 5 and 6 show components involved in routing annotated messages when optional features of the present invention are implemented.
Figure 6:
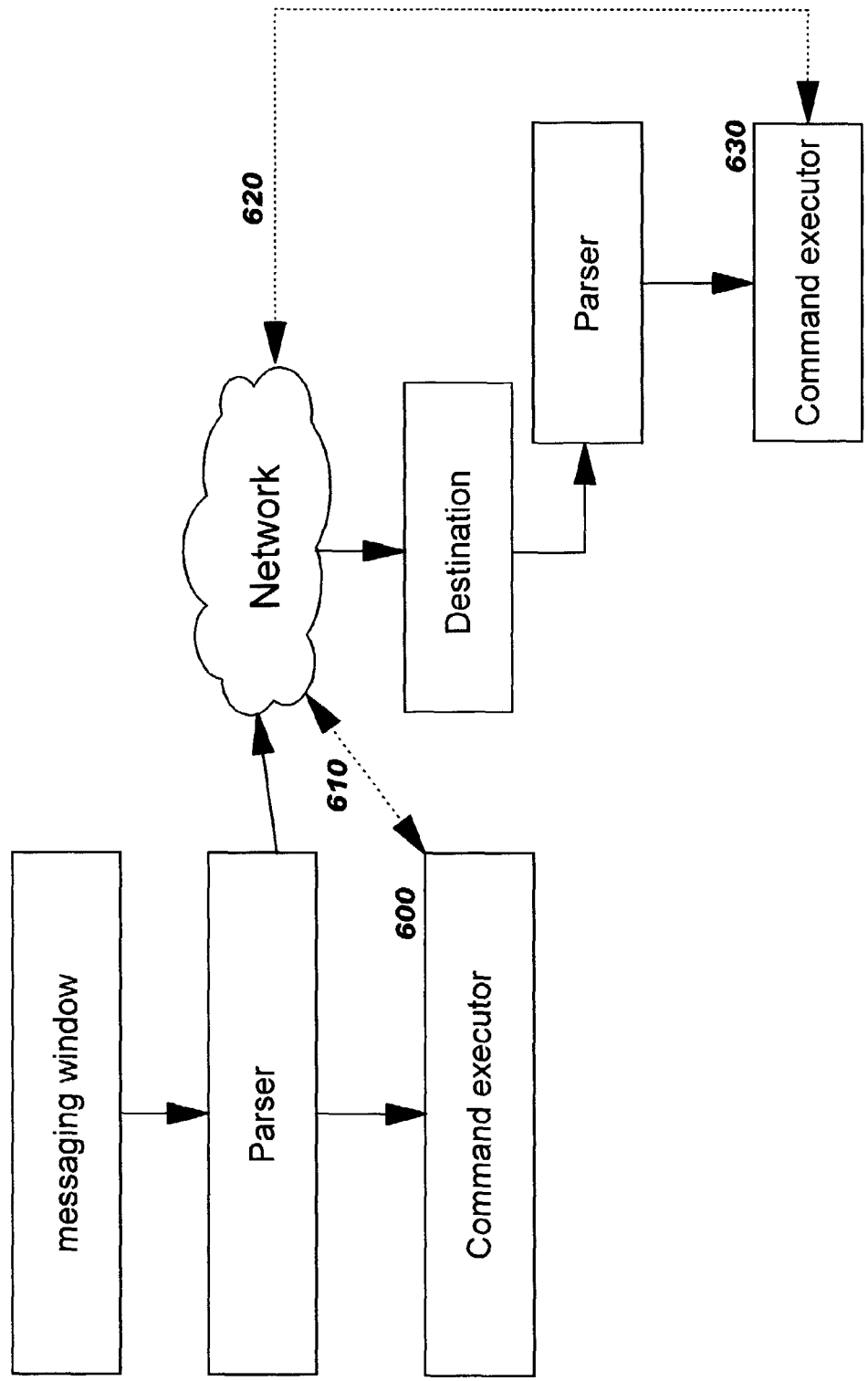

FIGS. 5 and 6 show components involved in routing annotated messages when optional features of the present invention are implemented. In FIG. 5, the command executor 520 interacts with a workflow system 500, and sends messages 510 that are appropriate for use with that system. For example, the command executor may be adapted for participating in the steps of particular workflows, and for generating messages that correspond to the message formats used by one or more steps of the workflow system. The command executor might also or alternatively interact with an e-mail system, and send messages formatted for transmission using e-mail. For example, the command executor might generate e-mail headers and append these headers to the annotated text, and forward the resulting message to the annotated message author's e-mail system for transmission as an outbound message.

FIG. 6 illustrates how command executors may interact with peer command executors in an optional feature of the present invention. These interactions are shown by dashed lines 610, 620 between a command executor 600 at the annotated message author's system and another command executor 630 at the destination. For example, if an annotated message is created and approval by the messaging partner is required before the command is executed (e.g., before the message is routed), the command executor 600 preferably sends a message requesting approval at 610 to the network, and this message is then forwarded as shown at 620 to command executor 630. The approval or disapproval is then preferably sent along this path in the reverse direction. An implementation may be configured for programmatically determining whether approval should be granted. For example, user preferences may be consulted to determine whether this user approves of routing messages from the IM session to other parties. A rule-based approach might be used, if desired, to provide further controls over this programmatic determination (e.g., allowing factors such as the identification of the IM session partner, and perhaps keywords from the message and/or annotation, to be used when making the determination). Or, the user at the destination might be queried to determine whether routing the annotated message is acceptable, and the user's response is then returned 620, 610.

As has been demonstrated, the present invention provides advantageous techniques for improving communication, whereby message content is routed efficiently while allowing different recipients to receive different versions of the content. The disclosed techniques are easy to use, and do not require the message creator to leave his IM session (or its ongoing context) to annotate a message.

The present invention enables users of collaborative message exchange systems to include others, for selected portions of a real-time message exchange, on an ad-hoc basis. The optional approval process allows other participants in the message exchange to exercise control over the information that will be shared.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or flow diagrams of methods, apparatus (systems) and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

While preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of communicating during an instant messaging ("IM") session, comprising:
    creating, by a message author participating in the IM session, a first message to be sent to each of at least one other participants in the IM session;
    designating in the first message, by the message author, at least one portion of the first message for sending to a non-participant in the IM session;
    annotating the first message, by the message author, with at least one messaging identifier associated with the non-participant and, for each of the at least one messaging identifiers, a corresponding routing method;
    sending a query to each of the at least one other participants to determine if they approve sending the at least one designated portion to the non-participant, and if a response to each sent query indicates that the at least one other participants approve the sending, then:
        programmatically generating a second message that comprises each of the at least one designated portions of the first message and excludes other portions of the first message; and
        sending the second message to the non-participant using at least one of the messaging identifiers with which the first message is annotated and the corresponding routing method; and
    sending the first message to each of the at least one other participants in the IM session using the IM session, wherein at least one of the corresponding routing methods used for sending the second message to the non-participant is different from the IM session used for sending the first message to each of the at least one other participants.

2. The method according to claim 1, wherein at least one of the corresponding routing methods comprises sending the second message as an instant message from the message author to the non-participant.

3. The method according to claim 1, wherein at least one of the corresponding routing methods comprises sending the second message as an e-mail message from the message author to the non-participant.

4. The method according to claim 1, wherein at least one of the corresponding routing methods comprises sending the second message as a text pager message from the message author to the non-participant.

5. The method according to claim 1, wherein the non-participant is an automated process.

6. The method according to claim 5, wherein the programmatically generating further comprises programmatically generating the second message in a format adapted for processing by the automated process.

7. The method according to claim 1, wherein the message author is an automated process.

8. The method according to claim 1, further comprising:
    annotating the first message, by the message author, with at least one annotation corresponding to at least one of the at least one designated portions; and
    wherein the programmatically generating includes, in the second message, each of the at least one corresponding annotations.

9. The method according to claim 8, further comprising including each of the at least one annotations in the first message sent to each of the at least one other participants.

10. The method according to claim 1, wherein the programmatically generating further comprises programmatically supplying contextual information pertaining to the IM session and including the programmatically-supplied contextual information in the second message.

11. A method of communicating during an instant messaging ("IM") session, further comprising:
   receiving an annotated message at a message processor for the IM session, wherein the annotated message comprises:
      a message body, the message body comprising a portion of the IM session selected by a first participant in the IM session;
      one or more delimiters that designate a portion of the message body selected by the first participant for sending to at least one non-participant in the IM session;
      an annotation provided by the first participant and corresponding to the designated portion; and
      a recipient list provided by the first participant, the recipient list identifying each of the at least one non-participants and providing an identification of at least one routing method usable for sending the designated portion and the corresponding annotation to each of the at least one non-participants; and
   processing the annotated message by the message processor, further comprising:
      sending a query to each of the at least one other participants in the IM session to determine if they approve sending the designated portion to each of the at least one non-participants, and if a response to each sent query indicates that the at least one other participants approve the sending, then sending the designated portion and the corresponding annotation, while excluding other portions of the message body, to each of the at least one non-participants identified on the recipient list using at least one of the routing methods identified for that non-participant; and
      sending the message body to each of the at least one other participants in the IM session, using the IM session, wherein at least one of the routing methods used for sending the designated portion to each of the at least one non-participants is different from the IM session used for sending the message body to each of the at least one other participants.

12. The method according to claim 10, wherein the programmatically-supplied contextual information comprises at least one of: a time of the IM session; an identification of the message author; and an identification of each of the at least one other participants in the IM session.

13. A method of communicating, during an instant messaging ("IM") session, with a non-participant in the IM session, comprising:
   programmatically generating a message, for the non-participant, comprising a portion of an electronic conversation in the IM session, the portion of the IM conversation designated by a first participant in the IM session for sending to the non-participant, wherein the programmatically-generated message excludes non-designated portions of the electronic conversation;
   providing the electronic conversation to each of at least one other participants in the IM session, using the IM session; and
   sending a query to each of the at least one other participants to determine if they approve sending the designated portion to the non-participant, and if a response to each sent query indicates that the at least one other participants approve the sending, then sending the programmatically-generated message to the non-participant using at least one messaging identifier associated with the non-participant and a routing method corresponding thereto, each of the at least one messaging identifiers and corresponding routing methods obtained from an annotation of the portion provided by the first participant during the electronic conversation, wherein at least one of the corresponding routing methods used for sending the programmatically-generated message to the non-participant is different from the IM session used for providing the electronic conversation to each of the at least one other participants.

14. The method according to claim 13, wherein:
   the annotation comprises a plurality of messaging identifiers associated with the non-participant and, for each of the plurality of messaging identifiers, a corresponding routing method; and
   the sending further comprises sending the programmatically-generated message to the non-participant using at least two successive ones of the messaging identifiers and the corresponding routing methods until detecting that the sending completes successfully.

15. The method according to claim 1, wherein the response is created, for at least one of the at least one other participants, by programmatically evaluating rules to determine whether the at least one designated portion is approved for sending to the non-participant.

16. The method according to claim 15, wherein the rules specify, as factors influencing the approval, at least one of: an identification of the message author; an identification of at least one selected one of the other participants; and at least one keyword to be searched for in the at least one designated portion.

* * * * *